United States Patent [19]

Baldino et al.

[11] 3,919,128

[45] Nov. 11, 1975

[54] URETHANE-MODIFIED POLYISOCYANURATE FOAMS

[75] Inventors: James P. Baldino, Haddonfield, N.J.; Joseph Feltzin, Wilmington, Del.

[73] Assignee: ICI United States Inc., Wilmington, Del.

[22] Filed: July 23, 1974

[21] Appl. No.: 491,059

Related U.S. Application Data

[63] Continuation-in-part of Ser. No. 361,570, May 18, 1973, abandoned.

[52] U.S. Cl. .. 260/2.5 AW; 260/2.5 AJ; 260/2.5 AP
[51] Int. Cl.² ......................................... C08G 18/14
[58] Field of Search .... 260/2.5 AW, 2.5 AP, 2.5 AJ

[56] References Cited

UNITED STATES PATENTS

| | | | |
|---|---|---|---|
| 3,250,745 | 5/1966 | Davis et al. | 260/47 |
| 3,644,232 | 2/1972 | Bernard et al. | 260/2.5 |
| 3,676,380 | 7/1972 | McLoughlin et al. | 260/2.5 |
| 3,745,133 | 7/1973 | Comunale et al. | 260/2.5 |

*Primary Examiner*—Eugene C. Rzucidlo

[57] ABSTRACT

A fire-retardant, urethane modified, polyisocyanurate foam having a percent friability of about 60 percent or less and a weight retention of greater than about 70 percent is disclosed. These foams are prepared by including in the foam-forming composition at least one compound which is an alkoxylated bisphenol.

10 Claims, No Drawings

URETHANE-MODIFIED POLYISOCYANURATE FOAMS

BACKGROUND OF THE INVENTION

This application is a continuation-in-part of application Ser. No. 361,570 filed May 18, 1973 now abandoned.

FIELD OF THE INVENTION

The present invention relates generally to polyisocyanurate foams having good fire retardancy and reduced friability and to compositions useful in the preparation of said foams. More particularly, the present invention relates to fire-retardant, urethane-modified, polyisocyanurate foams having a weight retention of greater than about 70 percent and a friability of about 60 percent or less. Compositions useful in the preparation of said foams comprise, in addition to an isocyanate, a catalyst, a blowing agent and a surfactant, a compound having the following formula:

$$H(OR')_aO-A-O(R'O)_bH$$

wherein

R' is an alkylene group containing from 2 to 4 carbon atoms or the radical —$CH_2$ CH$\phi$—, $a$ and $b$ are integers each of which is equal to at least 1 and the sum of which is equal to at least 4, and A is a radical having one of the following formulas:

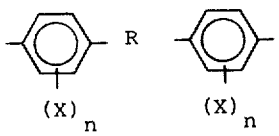

wherein

R is an alkylidene group containing from 1 to 4 carbon atoms, a cycloalkylidene group containing 5 or 6 carbon atoms, oxygen, sulfur, or a radical having one of the following formulas:

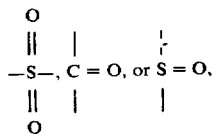

X is halogen or an alkyl radical containing from 1 to 3 carbon atoms and $n$ is an integer equal to from 0 to 4;

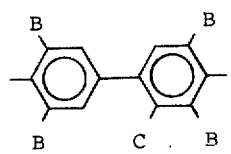

wherein
B is hydrogen or an alkyl group containing from 1–4 carbon atoms and C is hydrogen or halogen;

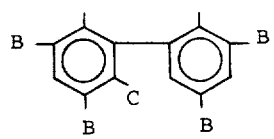

wherein
B and C are as defined above;

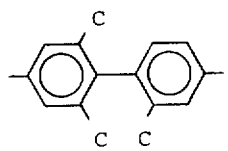

wherein
C is hydrogen or halogen provided that at least 2 of the substituents are halogen.

DESCRIPTION OF THE PRIOR ART

Polyurethane foams prepared by reacting an active hydrogen-containing compound with an organic polyisocyanate are well known in the art. A wide variety of active hydrogen-containing compounds such as polyols, including both polyethers and polyesters, have been disclosed. However, one property of polyurethane foams which has limited their utility for certain applications is the tendency of the foams to burn, particularly when exposed to an open flame.

Polyisocyanurate foams prepared by polymerizing an isocyanate have also been disclosed. These materials have improved high temperature properties as compared to the polyurethanes and are inherently fire retardant. However, These materials also are friable making them unsuitable for use in some applications. As used herein, the term "friability" refers to the tendency of the foam to crumble or be reduced to a powder.

Previous attempts to reduce the friability of the polyisocyanurate foams have included the addition of one or more active hydrogen-containing compounds to the composition used to prepare these materials. The effect of the active hydrogen-containing material is to introduce urethane linkages into the resulting foam, referred to as a urethane-modified, polyisocyanurate foam, thereby decreasing the cross-link density of the foam and reducing the friability. A variety of hydroxyl-containing compounds have been suggested for this use. Compounds which have been suggested are disclosed in U.S. Pat. No. 3,625,872 and British Pat. No. 1,104,394. The materials suggested in these and other prior art references include a variety of polyesters and polyethers. However, when these additives are employed, in addition to reducing the friability of the foam, there is also a corresponding reduction in the fire retardancy of the foam.

It would, therefore, be desirable to reduce the friability of the foam without significantly reducing the fire retardant properties thereof.

In accordance with the present invention, polyisocyanurate foams having reduced friability and good fire retardancy are prepared.

SUMMARY OF THE INVENTION

In accordance with the present invention, fire-retardant, polyisocyanurate foams are prepared, said foams having a percent friability equal to about 60 percent or less and a weight retention of greater than about 70 percent. These foams are prepared by including in the foam-forming composition a compound having the following formula:

$$H(OR')_aO-A-O(R'O)_bH$$

wherein

R' is an alkylene group containing from 2 to 4 carbon atoms or the radical —CH₂CHØ—, a and b are integers each of which is equal to at least 1 and the sum of which is equal to at least 4, A is a radical having one of the following formulas:

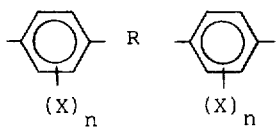

wherein

R is an alkylidene group containing from 1 to 4 carbon atoms, a cycloalkylidene group containing 5 or 6 carbon atoms, oxygen, sulfur or a radical having one of the following formulas:

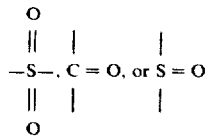

X is halogen or an alkyl radical containing from 1 to 3 carbon atoms and n is an integer equal to from 0 to 4;

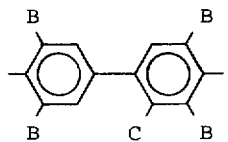

wherein

B is hydrogen or an alkyl group containing from 1–4 carbon atoms and C is hydrogen or halogen;

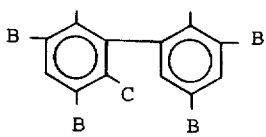

wherein

B and C are defined above;

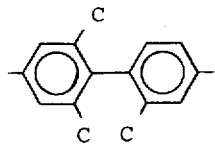

wherein

C is hydrogen or halogen provided that at least 2 of the substituents are halogen.

DESCRIPTION OF THE PREFERRED EMBODIMENTS

As mentioned above, in accordance with the present invention, polyisocyanurate forms which are fire retardant and have reduced friability are disclosed. As used herein, fire-retardant foams are defined in terms of their weight retention, when measured in accordance with the procedure described in the Butler Chimney Test in *Journal of Cellular Plastics*, Volume 3, 1967, at page 497. When tested in this manner, the foams of the present invention are characterized by a weight retention of greater than about 70 percent. In addition to being fire retardant, the polyisocyanurate foams of the present invention, unlike those described in the prior art, have greatly reduced friability. In this regard, the friability of the foams is measured in accordance with A.S.T.M. Standard Test C421–61. When tested in this manner, the foams of the present invention are characterized by a percent friability of about 60 percent or less.

The improved polyisocyanurate foams of the present invention are preferably prepared from a composition comprising a. a polyether polyol,
b. an isocyanate,
c. a catalyst,
d. a blowing agent, and
e. a surfactant.

Each of these compounds is described in detail below.

Isocyanate

The isocyanates which may be employed in accordance with the present invention include any of those which have been suggested in the prior art for the preparation of polyisocyanurate foams. These include both di- and polyisocyanates as well as aromatic and aliphatic isocyanates. Representative isocyanates which may be employed include, for example, tolylene diisocyanate; para-phenylene diisocyanate; 1-methoxy-phenylene 2,4-diisocyanate; diphenylene 4,4-diisocyanate; toluene 2,4,6-triisocyanate; 1-ethyl-benzene 2,4-diisocyanate; triphenyl methane 4,4',4''-triisocyanate; diphenyl methane diisocyanate; xylylene diisocyanate; bis-cyclohexyl methane diisocyanate; naphthalene diisocyanate; and isophorone diisocyanate.

In addition to having a functionality equal to at least about 2.0, the isocyanates which may be employed should have a molecular weight equal to at least about 160. If isocyanates having lower molecular weights are employed, it has been found that satisfactory foams are not produced.

Polyol

As described above, the polyether polyols which may be employed in the preparation of the improved polyisocyanurate foams of the present invention have the following formula:

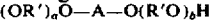
H(OR')ₐO—A—O(R'O)ᵦH wherein

R' is an alkylene group containing from 2 to 4 carbon atoms or the radical —CH₂CHØ—, a and b are integers each of which is equal to at least 1 and the sum of which is equal to at least 4, and A is a radical having one of the following formulas:

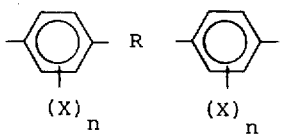

wherein

R is an alkylidene group containing from 1 to 4 carbon atoms, a cycloalkylidene group containing 5 or 6 carbon atoms, oxygen, sulfur or a radical having one of the following formulas:

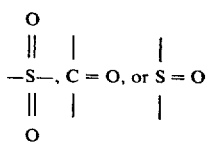

X is halogen or an alkyl radical containing from 1 to 3 carbon atoms and n is an integer equal to from 0 to 4;

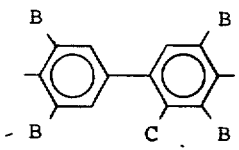

wherein

B is hydrogen or an alkyl group containing from 1–4 carbon atoms and C is hydrogen or halogen;

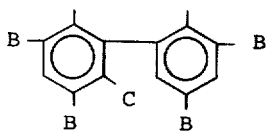

wherein
B and C are as defined above;

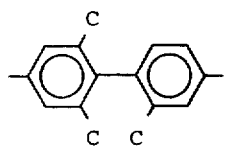

wherein

C is hydrogen or halogen provided that at least 2 of the substituents are halogen.

Each of these polyols is described below. The first type of polyol which may be utilized is referred to as an alkoxylated bisphenol. These materials are represented by the following formula:

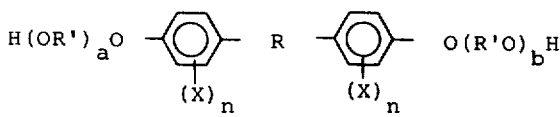

wherein

R, R', X, a, b and n are as defined above.

These polyether polyols are prepared by reacting a dihydric alcohol, such as a bisphenol A or a substituted bisphenol A, with an alkylene oxide, such as ethylene oxide, propylene oxide, and butylene oxide or with styrene oxide. However, to produce the foams of the present invention, it has been found to be critical that the amount of alkylene oxide or sytrene oxide reacted be sufficient to introduce to least 4 alkylene or —CH$_2$CH$\phi$— groups into the molecule. If less than about 4 of said units are contained in the molecule, it has been found that no significant reduction in friability of the foams as compared to those achieved with other polyethers is obtained. It has also been found that the friability can be further reduced by introducing more than about 4 alkylene or —CH$_2$CH$\phi$— units into the molecule. However, when the number of units introduced is greater than about 12, it has been found that, while the friability of the foams is reduced, a simultaneous reduction in fire retardancy is also noted. As mentioned above, this is undesirable. Therefore, it is preferred to employ polyols in which the sum of a plus b in the above formula is equal to from about 4 to about 12. Especially preferred results have been achieved with polyols having an average value of a plus b equal to from about 5 to about 10.

Representative polyols which may be employed include, for example, polyoxyethylene(4)-bis(4-hydroxyphenyl)propane; polyoxystyrene(6)-bis(2,6-dibromo-4-hydroxyphenyl)methane; polyoxybutylene(6)-bis(4-hydroxyphenyl)ketone; polyoxyethylene(9)-bis(4-hydroxyphenyl)ether; polyoxystyrene(4)-bis(2,6-dichloro-4-hydroxyphenyl)thioether; polyoxypropylene(12)-bis(4-hydroxyphenyl)sulfone; polyoxystyrene(9)-bis(2,6-dimethyl-4-hydroxyphenyl)ethane; polyoxyethylene(5)-bis(2,3,5,6-tetrabromo-4-hydroxyphenyl)butane; polyoxyethylene(10)-bis(4-hydroxyphenyl)cyclohexane; polyoxypropylene(6)-bis(4-hydroxyphenyl)sulfoxide.

It is especially preferred to employ polyols within the above formula wherein

R' is an alkylene group containing from 2 to 3 carbon atoms, n is zero, and

R is an alkylidene group containing 3 carbon atoms.

In preparing the polyisocyanurate foams of the present invention, preferred results have been achieved when a blend of two or more of the polyols described above are employed in the foam-forming composition. When a blend of polyols is utilized, it has been found that the reaction rate involved in the formation of the foam can be easily controlled, thus making the compositions useful in a wide variety of applications.

In accordance with the present invention, preferred results have been achieved when a blend of polyols is employed. Preferred blends are those in which an ethylene oxide derivative of one of the dihydric alcohols defined above is combined with a propylene oxide, butylene oxide or styrene oxide derivative of one of said dihydric alcohols. Especially preferred results have been achieved with a combination of a polyether prepared by reacting ethylene oxide and bisphenol A as described above with a polyether prepared by reacting propylene oxide with bisphenol A also as described above. The relative amount of each polyol in the blend may be varied over a wide range and has not been found to be narrowly critical to the production of the improved polyisocyanurate foams of the present invention. Thus, blends containing from about 10 percent to about 90 percent by weight of polyol prepared from ethylene oxide and from about 90 percent to about 10 percent by weight of another polyol within the above formula may preferably be employed in the compositions of the present invention.

The remaining polyols are referred to generally as alkoxylated biphenols. The first type of these materials is represented by the following formula

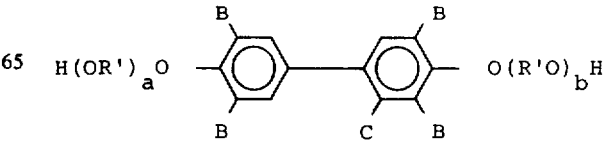

wherein R', B, C, a and b are as defined above.

As in the case of the alkoxylated bisphenols, these materials are prepared by reacting a biphenol or a substituted biphenol with an alkylene oxide, such as ethylene oxide, propylene oxide, or butylene oxide or with styrene oxide.

Representative biphenols which may be employed in the preparation of these polyols include, for example, 4,4' biphenol; 3 chloro-4,4'biphenol; 3 bromo-4,4'biphenol; 2,2',6,6' tetramethyl-4,4'biphenol, 2,2',6-,6'tetramethyl-3-chloro-4,4'biphenol; 2,2'diethyl-4,4'biphenol, 2,2',6,6'tetra-t-butyl-4,4'biphenol, 2,2',6,6'tetraisopropyl-3-bromo-4,4'biphenol, and 2,2'di-n-propyl-4,4'biphenol. All of these materials are commercially available or can be prepared quite readily by anyone of ordinary skill in the art. For example, the alkyl derivatives may be prepared by the oxidative coupling of an alkyl substituted phenol such as 2,6-dimethyl phenol or 2,6-diisopropyl phenol. This reaction is carried out in accordance with the following general reaction wherein B is an alkyl group containing from 1 to 4 carbon atoms.

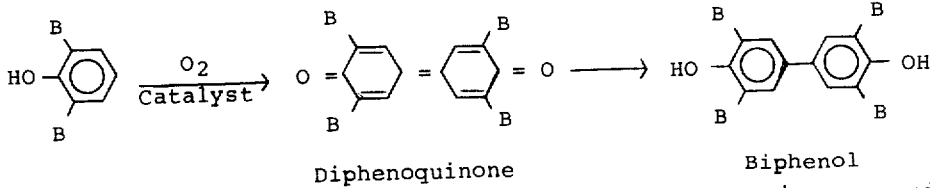

Diphenoquinone                    Biphenol

Suitable procedures for carrying out the oxidative coupling reaction are described, for example, in U.S. PAt. No. 3,804,865 issued to Rutledge. The halogenated derivatives may be prepared by reacting a hydrogen halide with 4,4'diphenoquinone or an alkyl substituted diphenoquinone by procedures which are also well known in the art. See, in this regard, the procedure described in U.S. Pat. No. 3,720,721 issued to Becker et al., and *Berichte*, Vol. 38, p. 226–237 (1905).

The second type of alkoxylated biphenol is represented by the following formula

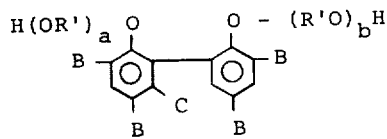

wherein R', B, C, a and b are as defined above.

These polyether polyols are also prepared by reacting a biphenol or substituted biphenol with an alkylene oxide, such as ethylene oxide propylene oxide, and butylene oxide, or with styrene oxide.

Representative biphenols which may be utilized in preparing the above-mentioned materials include, for example, 2,2'biphenol; 2,2',4,4'tetramethyl, 6,6'biphenol; 2,2'4,4'tetramethyl-5-chloro-6,6'biphenol; 2,2',4,4'tetraisopropyl-6,6'biphenol; and 2,2',4,4'tetra-t-butyl-6,6'-biphenol. All of these compounds are commercially available or can be prepared by procedures which are known in the art. For example, the alkyl derivatives may be prepared by the oxidative coupling of 2,4 dialkyl phenols employing procedures similar to those mentioned above for the 2,6 dialkyl phenols. Similarly, the halogenated derivatives are prepared by reacting a hydrogen halide with 2,2'diphenoquinone or an alkyl substituted diphenoquinone.

The final type of alkoxylated biphenols which may be utilized are represented by the following formula

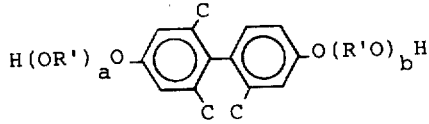

wherein C is hydrogen or halogen provided that at least two of the substituents are halogen and R', a and b are as defined above. The biphenols utilized in preparing these derivatives may be prepared by reacting a halogen halide with 4,4'diphenoquinone. The number of halogen substituents on the molecule is determined by the number of mols of hydrogen halide reacted with each mol of diphenoquinone and, therefore, there must be utilized at least 2 mols of hydrogen halide per mol of the diphenoquinone.

Representative compounds coming within this formula which may be utilized include, for example, 3,5 dichloro-4,4'biphenol; 3,3'dibromo-4,4'-biphenol; 3,3'5-trifluoro-4,4'biphenol, and 3,3'diiodobiphenol.

As in the case of the alkoxylated bisphenols discussed above, the alkoxylated biphenols useful in the preparation of polyisocyanurate foams in accordance with the present invention are prepared by reacting one of the above described biphenols with an alkylene oxide, such as ethylene oxide, propylene oxide, or butylene oxide, or with styrene oxide. As is well known, in the material prepared with styrene oxide R' is equal to

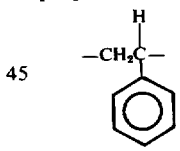

generally expressed as -CH$_2$CH$\phi$-. Here also, to produce the foams of the present invention it is essential that the amount of alkylene oxide or styrene oxide employed is sufficient to introduce at least 4 alkylene or —CH$_2$CH$\phi$— groups into the molecule. Thus the sum of a and b in the above formula must be equal to at least 4. Preferred results are achieved with polyols in which the sum of a and b in the above formula is equal to from about 4 to about 12. Especially preferred results have been achieved with polyols having an average value of a + b equal to from about 5 to about 10.

The total amount of polyol employed in the foam-forming composition is preferably equal to less than the amount required to react with about 25 percent of the isocyanate (—NCO) groups in said composition. This preferred maximum amount of polyol can be determined in accordance with the following formula:

grams I/eq. wt. I × 0.25 eq. wt. P = grams P wherein
grams I refers to the total grams of isocyanate employed;

eq. wt. I refers to the equivalent weight of the isocyanate — i.e., the number of grams of isocyanate required to introduce one -NCO group into the composition;

eq. wt. P refers to the equivalent weight of the polyol or polyol blend — i.e., the number of grams of polyol required to introduce one hydroxyl (—OH) group into the composition; and grams P refers to the amount of polyol which can be employed in the composition.

Thus, if 100 grams of a crude methylene diisocyanate having an equivalent weight of 137 — i.e., one —NCO group for each 137 grams — is employed and a polyol having an equivalent weight of 280 — i.e., one hydroxyl group for each 280 grams — is to be added, the preferred amount of polyol should be equal to up to about 51 grams. This amount is determined as follows:

100/137 × 0.25 280 = 51

Similarly, when a polyol having an equivalent weight of 344 is employed, there is preferably added up to about 63 grams of said polyol. Although less than this amount of polyol may also be employed, it has been found that, the amount of polyol is reduced, the improved friability also decreases. Thus, it is preferred to employ an amount of polyol sufficient to react with at least 15 percent of the isocyanate groups in the foam-forming composition.

Catalyst

Any of the catalysts which have previously been disclosed for use in the preparation of isocyanurate foams may be employed in accordance with the present invention. Representative catalysts which may be utilized include, for example. N-alkyl morpholines such as N-methyl morpholine and N-ethyl morpholine; tertiary amines such as trimethyl amine, triethyl amine, tetramethyl quanidine, triethylene diamine, N,N,N',N'-tetramethyl-1,3-butane diamine; piperazine and piperazine derivatives such as N-methyl piperazine; tin catalysts including dialkyl tin laurates such as dibutyl tin dilaurate, dibutyl tin bis(2-ethyl hexoate), dibutyl tin diacetate, stannous oleate and stannous octoate; potassium acetate; sodium methoxide; biacetyl; lead naphthenate; lead octoate; Mannich bases such as 2,4,6-tris-(dimethylamino methyl)phenol and combinations of DABCO (1,4-diazabicyclo-2,2,2-octane) and epoxides.

Mixtures of catalysts may also be employed. The amount of catalyst or mixture of catalysts employed may be varied over a wide range depending upon the formulation employed and the type of catalyst, all of which is well known to those skilled in the art. For most applications, the catalyst, either as a single compound or as a mixture of compounds, is employed in an amount equal to from about 1 to about 10 parts by weight per 100 parts by weight of the total formulation.

Blowing Agent

Polyisocyanurate foams are prepared when low boiling liquids, gaseous blowing agents, or inflatants are incorporated into, or generated by, the isocyanurate-forming reactants. Blowing agents which may be employed include, for example, any of those which are used in the preparation of conventional polyurethane foams including, for example, water; the chlorinated and fluorinated alkanes having from 1 to about 3 carbon atoms such as chlorofluoromethanes, chlorofluorobutanes, and chlorofluoroethanes including, for example, trichlorofluoromethane (Freon 11), monochloroethane, monochloromonofluoroethane, 1,2,-dibromo-1,1,2,2-tetrafluoroethane, 1,1,2-trifluoroethane, 1,1,2,2,-tetrafluoro-1,2-dichloroethane, 1,2-difluoro-1,1,2,2-tetrachloroethane, dichloromethane, dibromomethane and mixtures thereof.

The amount of blowing agent employed is preferably sufficient to produce a foam having a nominal density of 2 — i.e., from about 1.5 to about 2.5. However, either more than or less than this amount of blowing agent may be employed in the preparation of foams of the present invention. It should be noted at this point that, as the density of the foam is increased, the friability decreases and, thus, the improved properties of the foams of the present invention are less noticeable in foams of increased density.

Surfactants

When blowing agents are included in or generated by the isocyanurate-forming reactants, there is also generally included in the composition a stabilizer, the function of which is to control the amount of quality of the foamed polyisocyanurate obtained. Without the stabilizers or surfactants, the foams may either collapse or contain very large and irregular cells. Representative surfactants which may be employed include surfactants which are generally used in the preparation of polyurethane foams. These include silicone surfactants and nonionic surfactants such as siloxane-oxyalkylene block copolymers as disclosed in U.S. Pat. No. 2,834,748 issued to Bailey et al. Other surfactants which may be used are condensates of ethylene oxide with a hydrophobic base formed by condensing propylene oxide with a propylene glycol. These surfactants have a molecular weight within the range of about 2,000 to about 8,000 and are generally ascribed the formula:

Another class of surfactants comprises alkylene oxide adducts of ethylene diamine having generally the formula:

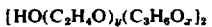

Still another class of surfactants comprise the polyoxyalkylene esters of long-chain fatty acids and sorbitan such as polyoxyethylene(20)sorbitan monolaurate, polyoxyethylene(4) sorbitan monolaurate, polyoxyethylene(20) sorbitan tristearate, polyoxyethylene(20) sorbitan monooleate, polyoxyethylene(5)sorbitan monooleate and polyoxyethylene(20) sorbitan trioleate.

The amount of surfactant employed can be varied over a wide range depending, for example, on the foam-forming composition employed and the properties desired in the final product. For most applications, the surfactant is employed in an amount equal to from about 0.5 to about 1.0 parts by weight per 100 parts by weight of the total formulation.

The foam-forming compositions of the present invention may also include a variety of additives such as those which are commonly employed in the preparation of polyisocyanurate foams. These may include, for example, auxiliary fire retardants such as tris(chloropropyl)phosphate and tris-betachloropropylphosphate. Other additives such as coloring agents, plasticizers, and contrast agents may also be used.

In carrying out the present invention, the one-shot technique for producing foam is usually employed at room temperature. In this method, all of the ingredients; that is, the isocyanate, the polyol, the blowing agent, the catalyst, and the surfactant, are simultaneously mixed with each other by any suitable means and then poured onto a surface where the foaming reaction takes place.

Any suitable mixing-type apparatus may be used. The mixing device may have any number of conduits leading thereto for introducing the different ingredients. For example, there may be one conduit for each ingredient or there may be a number less than the number of different ingredients. If the number of conduits is less than the total number of ingredients utilized, it will, of course, be necessary to combine several of the ingredients prior to introducing them into the mixer. The ingredients may be combined in any suitable manner, the only requirement being that premature reaction should not occur prior to introduction into the mixer.

Alternatively, a pre-polymer technique may be employed in the preparation of the foams of the present invention. In accordance with this technique, part of the reaction involved in making the polyisocyanurate foam is carried out yielding a prepolymer of increased molecular weight which pre-polymer is subsequently used to prepare the desired polyisocyanurate product. If a pre-polymer technique is employed, it is preferred to react a portion of the polyol with the isocyanate to prepare the pre-polymer.

A significant advantage of the fire-retardant, polyisocyanurate foams produced in accordance with the present invention is the reduced friability of said foams. As mentioned above, polyisocyanurate foams having the combined fire-retardant and friability properties of those of the present invention have heretofore been unavailable. These foams are particularly useful in applications such as insulation, laminants, and in a variety of other applications where rigid foam materials have been found to be useful. The foams may be prepared either as slab stock or bun stock which is subsequently fabricated for the desired end use or may be foamed, such as by spraying or pouring, in the place where they will ultimately be used.

In order to describe the present invention so that it may be more clearly understood, the following examples are set forth. These examples are set forth primarily for the purpose of illustration, and any specific enumeration of detail contained therein should not be interpreted as a limitation on the concept of this invention.

In evaluating the foams produced herein, the following standard tests were employed.

The fire retardancy of the foams was measured in accordance with the Butler Chimney Test as described in J. Cellular Plastics, Vol. 3, 497 (1967). The fire retardancy is expressed in terms of percent weight retention. A higher value indicates a more fire-retardant foam.

The percent friability of the foams was measured in accordance with A.S.T.M. Standard Test C421–61. The test involves measuring the weight loss of the foam after tumbling for a predetermined period of time and the results are expressed in terms of the percentage of weight lost. A lower value indicates a less friable foam.

All components in the foam-forming compositions are given in parts by weight. In order to more conveniently described the components of the foam-forming compositions utilized in the examples, the components are identified by their trademarks or a representative symbol. The trademarks or symbols used in the examples are identified as follows:

Rubinate M refers to an isocyanate having a functionality of about 2.7, an equivalent weight of 135, and is commercially available from Rubicon Chemicals Co.

TDi refers to an 80:20 mixture of the 2,4- and 2,6-isomers of the toluene diisocyanate.

L-5340 and L-5420 refer to silicone surfactants available from Union Carbide Corporation, New York, N.Y.

Solution A refers to a catalyst solution comprising 20 grams of potassium acetate, 20 grams of ethylene glycol, and 1 gram of water.

Pluronic L-61 refers to an ethylene oxide-propylene oxide block polymer available from Wyandotte Chemicals Corp.

Lubrol FSA also refers to an ethylene oxide-propylene oxide block polymer.

Freon R-11B is a trichlorofluoromethane blowing agent available from DuPont.

Polyol A refers to polyoxypropylene(9)-bis(4-hydroxyphenyl)propane.

Polyol B refers to polyoxyethylene(9)-bis(4-hydroxyphenyl)propane.

Polyol C refers to polyoxypropylene(6)-bis(4-hydroxyphenyl)propane.

Polyol D refers to polyoxypropylene(4)-bis(4-hydroxyphenyl)propane.

Polyol E refers to polyoxypropylene(12)-bis(4-hydroxyphenyl)propane.

Polyol F refers to polyoxyethylene(12)-bis(4-hydroxyphenyl)propane.

Polyol G refers to polyoxypropylene(9)(2,3-dibromo-4-hydroxyphenyl)propane.

Polyol H refers to polyoxypropylene(9)2,2',6,6' tetramethyl-4,4'biphenol.

Polyol J refers to polyoxystyrene(4)4,4'biphenol.

Polyol K refers to polyoxybutylene(12)2,2', 6,6'tetraisopropyl-3-chloro-4,4'biphenol.

Polyol L refers to polyoxyethylene(9)-3-bromo-4,4'biphenol.

Polyol M refers to polyoxypropylene(6)2,2'biphenol.

Polyol N refers to polyoxypropylene(5)2,2',4,4'tetramethyl-6,6'biphenol.

Polyol O refers to polyoxystyrene(7)2,2',4,4'tetra-t-butyl-5-bromo-6,6'biphenol.

Polyol P refers to polyoxyethylene(10)3,5-dichloro-4,4'biphenol.

Polyol Q refers to polyoxybutylene(8) 3,3'-dibromo-4,4'biphenol.

Polyol R refers to polyoxypropylene(4)3,3',5-trifluoro-4,4'biphenol.

EXAMPLE 1

A foam-forming composition was prepared comprising:

| | |
|---|---|
| Rubinate M | 100.0 |
| L-5340 | 0.8 |
| Solution A | 1.4 |
| Tris(betachloropropyl)phosphate | 10.0 |
| Pluronic L-61 | 4.0 |
| Freon R-11B | 18.0 |
| Polyol A | 25.0 |
| Polyol B | 25.0 |

Foam prepared from this composition had a density of 2.3 PCF and had the following physical properties:

| | |
|---|---|
| Weight retention | 92.0% |
| Friability | 27.0% |

EXAMPLE 2

A foam-forming composition was prepared comprising:

| | |
|---|---|
| Rubinate M | 100.0 |
| L-5340 | 0.8 |
| Solution A | 1.4 |
| Tris(betachloropropyl)phosphate | 10.0 |
| Pluronic L-61 | 4.0 |
| Freon R-11B | 18.0 |
| Polyol A | 37.5 |
| Polyol B | 12.5 |

Foam prepared from this composition had a density of 2.2 PCF and had the following physical properties:

| | |
|---|---|
| Weight retention | 91.0% |
| Friability | 40.0% |

EXAMPLE 3

A foam-forming composition was prepared comprising:

| | |
|---|---|
| Rubinate M | 100.0 |
| L-5340 | 0.8 |
| Solution A | 1.4 |
| Tris(betachloropropyl)phosphate | 10.0 |
| Pluronic L-61 | 4.0 |
| Freon R-11B | 18.0 |
| Polyol A | 50.0 |

Foam prepaaed from this composition had a density of 2.0 PCF and had the following physical properties:

| | |
|---|---|
| Weight retention | 85.0% |
| Friability | 40.0% |

EXAMPLE 4

A foam-forming composition was prepared comprising:

| | |
|---|---|
| Rubinate M | 100.0 |
| L-5340 | 0.8 |
| Solution A | 1.4 |
| Tris(betachloropropyl)phosphate | 10.0 |
| Pluronic L-61 | 4.0 |
| Freon R-11B | 18.0 |
| Polyol B | 50.0 |

Foam prepared from this composition had a density of 2.1 PCF and had the following physical properties:

| | |
|---|---|
| Weight retention | 93.5% |
| Friability | 19.0% |

EXAMPLE 5

A foam-forming composition was prepared comprising:

| | |
|---|---|
| Rubinate M | 100.0 |
| L-5340 | 0.8 |
| Solution A | 1.4 |
| Tris(betachloropropyl)phosphate | 10.0 |
| Pluronic L-61 | 4.0 |
| Freon R-11B | 18.0 |
| Polyol C | 50.0 |

Foam prepared from this composition had the following physical properties:

| | |
|---|---|
| Weight retention | 87.0% |
| Friability | 46.0% |

EXAMPLE 6

A foam-forming composition was prepared comprising:

| | |
|---|---|
| Rubinate M | 100.0 |
| Solution A | 1.4 |
| L-5420 | 1.0 |
| Tris(betachloropropyl)phosphate | 10.0 |
| Freon R-11B | 22.0 |
| Polyol D | 30.0 |

Foam prepared from this composition had the following physical properties:

| | |
|---|---|
| Weight retention | 82.0% |
| Friability | 60.0% |

EXAMPLE 7

A foam-forming composition was prepared comprising:

| | |
|---|---|
| Rubinate M | 100.0 |
| Solution A | 1.4 |
| L-5340 | 0.8 |
| Lubrol FSA | 4.0 |
| Tris(betachloropropyl)phosphate | 10.0 |
| Freon R-11B | 20.0 |
| Polyol E | 29.7 |
| Polyol F | 29.7 |

Foam prepared from this composition had the following physical properties:

| | |
|---|---|
| Weight retention | 66.0% |
| Friability | 27.5% |

EXAMPLE 8

A foam-forming composition was prepared comprising:

| | |
|---|---|
| Rubinate M | 100.0 |
| Solution A | 1.4 |
| L-5420 | 1.0 |
| Tris(betachloropropyl)phosphate | 10.0 |
| Freon R-11B | 22.0 |
| Polyol A | 29.5 |
| Polyol G | 29.5 |

Foam prepared from this composition had the following physical properties:

| | |
|---|---|
| Weight retention | 89.0% |
| Friability | 36.0% |

EXAMPLE 9

A foam-forming composition was prepared comprising:

| | |
|---|---|
| Rubinate M | 100.0 |
| Solution A | 1.5 |
| L-5420 | 1.0 |
| Tris(betachloropropyl)phosphate | 10.0 |
| Freon R-11B | 25.0 |
| Polyol A | 66.0 |

Foam prepared from this composition had the following physical properties:

| | |
|---|---|
| Weight retention | 82.0% |
| Friability | 30.0% |

EXAMPLE 10

A foam-forming composition was prepared comprising:

| | |
|---|---|
| Rubinate M | 100.0 |
| Solution A | 1.4 |
| L-5420 | 1.0 |
| Freon R-11B | 21.0 |
| Polyol A | 39.0 |

Foam prepared from this composition had the following physical properties:

| | |
|---|---|
| Weight retention | 90.0% |
| Friability | 35.0% |

EXAMPLE 11

A foam-forming composition was prepared comprising:

| | |
|---|---|
| Rubinate M | 100.0 |
| Solution A | 1.4 |
| L-5340 | 1.0 |
| Freon R-11B | 22.0 |
| Polyol H | 43.5 |

Foam prepared from this composition had the following physical properties:

| | |
|---|---|
| Weight retention | 86.9% |
| Friability | 25.2% |

EXAMPLE 12

A foam-forming composition was prepared comprising:

| | |
|---|---|
| Rubinate M | 100.0 |
| Solution A | 1.4 |
| L-5340 | 1.0 |
| Freon R-11B | 22.0 |
| Polyol H | 58.5 |

Foam prepared from this composition had the following physical properties:

| | |
|---|---|
| Weight retention | 75.1% |
| Friability | 22.2% |

EXAMPLES 13–21

Foam-forming compositions were prepared employing the components described in the following table. Foams prepared from each of these compositions have a weight retention greater than 70 percent and a percent friability of 60% or less.

EXAMPLE

| COMPONENT | 13 | 14 | 15 | 16 | 17 | 18 | 19 | 20 | 21 |
|---|---|---|---|---|---|---|---|---|---|
| Rubinate M | 100 | 100 | 100 | 100 | 100 | 100 | 100 | 100 | — |
| TDi | — | — | — | — | — | — | — | — | 100 |
| Solution A | 1.4 | 1.4 | 1.4 | 1.4 | 1.4 | 1.4 | 1.4 | 1.4 | 1.4 |
| L-5420 | 1.0 | 1.0 | 1.0 | 1.0 | 1.0 | 1.0 | 1.0 | 1.0 | 1.0 |
| Freon R-11B | 22.0 | 22.0 | 22.0 | 22.0 | 22.0 | 22.0 | 22.0 | 22.0 | 22.0 |
| Polyol J | 50.08 | | | | | | | | |
| Polyol K | | 218.4 | | | | | | | |
| Polyol L | | | 49.7 | | | | | | |
| Polyol M | | | | 40.15 | | | | | |
| Polyol N | | | | | 40.0 | | | | |
| Polyol O | | | | | | 99.92 | | | |
| Polyol P | | | | | | | 52.18 | | |
| Polyol Q | | | | | | | | 69.17 | |
| Polyol R | | | | | | | | | 35.49 |

What is claimed is:

1. A fire-retardant, polyisocyanurate foam having a weight retention of greater than about 70 percent and a percent friability of about 60 percent or less, said foam comprising the reaction product of a composition comprising an organic polyisocyanate having a functionality equal to at least about 2.0 and a molecular weight equal to at least about 160, an isocyanurate catalyst, a blowing agent, a surfactant and a polyol, said polyol having the following formula:

$$H(OR')_aO—A—O(R'O)_bH$$

wherein

R' is an alkylene group containing from 2 to 4 carbon atoms or the radical $—CH_2CH\phi—$, a and b are integers each of which is equal to at least 1 and the sum of which is equal to from about 4 to about 12, and A is a radical having one of the following formulas

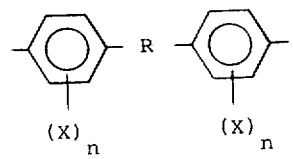

wherein

R is an alkylidene group containing from 1 to 4 carbon atoms, a cycloalkylidene group containing 5 or 6 carbon atoms, oxygen, sulfur or a radical having one of the following formulas:

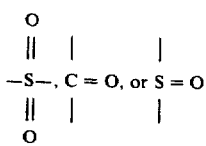

X is halogen or an alkyl radical containing from 1 to 3 carbon atoms, and n is an integer equal to from 0 to 4;

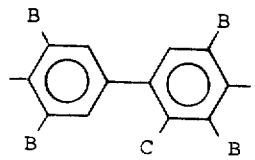

wherein

B is hydrogen or an alkyl group containing from 1–4 carbon atoms and C is hydrogen or halogen;

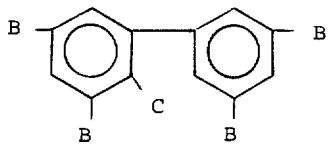

wherein

B and C are as defined above; and

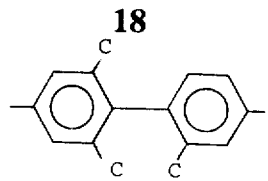

wherein

C is hydrogen or halogen provided that at least 2 of the substituents are halogen;

provided that the amount of polyol is equal to less than the amount required to react with about 25 percent of the total isocyanate groups in said composition.

2. A foam, as claimed in claim 1, wherein the sum of $a$ and $b$ in said polyol is equal to from about 5 to about 10.

3. A foam, as claimed in claim 1, wherein the sum of $a$ and $b$ in said polyol is equal to about 6.

4. A foam, as claimed in claim 1, wherein the sum of $a$ and $b$ in said polyol is equal to about 9.

5. A foam, as claimed in claim 1, wherein a blend of polyols is employed.

6. A foam, as claimed in claim 5, wherein in one polyol in said blend R' is ethylene.

7. A foam, as claimed in claim 5, wherein in one polyol in said blend R' is ethylene and in a second polyol in said blend R' is propylene.

8. A foam, as claimed in claim 1, wherein the amount of catalyst employed in said composition is equal to from about 1 to about 10 parts by weight per 100 parts by weight of the total formulation.

9. A foam, as claimed in claim 1, wherein the amount of blowing agent in said composition is sufficient to produce a foam having a nominal density of 2PCF.

10. A foam, as claimed in claim 1, wherein the amount of surfactant in said composition is equal to from about 0.5 to 1.0 parts by weight per 100 parts by weight of the total formulation.

* * * * *